US012720425B2

(12) United States Patent
Atarius et al.

(10) Patent No.: US 12,720,425 B2
(45) Date of Patent: Aug. 25, 2026

(54) ACCESS NETWORK SELECTION POLICY WITH NETWORK SLICE SELECTION ASSISTANCE INFORMATION

(71) Applicant: Lenovo (Singapore) Pte. Ltd., New Tech Park (SG)

(72) Inventors: Roozbeh Atarius, La Jolla, CA (US); Apostolis Salkintzis, Athens (GR); Dimitrios Karampatsis, Ruislip (GB)

(73) Assignee: Lenovo (Singapore) Pte. Ltd., Singapore (SG)

(*) Notice: Subject to any disclaimer, the term of this patent is extended or adjusted under 35 U.S.C. 154(b) by 222 days.

(21) Appl. No.: 18/568,762

(22) PCT Filed: Jul. 26, 2021

(86) PCT No.: PCT/EP2021/070827
§ 371 (c)(1),
(2) Date: Dec. 8, 2023

(87) PCT Pub. No.: WO2022/258205
PCT Pub. Date: Dec. 15, 2022

(65) Prior Publication Data

US 2024/0276360 A1 Aug. 15, 2024

(30) Foreign Application Priority Data

Jun. 8, 2021 (GR) .............................. 20210100376

(51) Int. Cl.
*H04W 48/18* (2009.01)
*H04W 48/16* (2009.01)
*H04W 84/12* (2009.01)

(52) U.S. Cl.
CPC ........... *H04W 48/18* (2013.01); *H04W 48/16* (2013.01); *H04W 84/12* (2013.01)

(58) Field of Classification Search
CPC ...... H04W 48/16; H04W 48/18; H04W 84/12
See application file for complete search history.

(56) References Cited

U.S. PATENT DOCUMENTS

2016/0360476 A1* 12/2016 Kim ...................... H04W 48/16
2020/0107190 A1* 4/2020 Tang ................... H04W 12/062
(Continued)

FOREIGN PATENT DOCUMENTS

WO 2020098954 A1 5/2020

OTHER PUBLICATIONS

PCT/EP2021/070827, "International Search Report and the Written Opinion of the International Searching Authority, or the Declaration", International Searching Authority, Feb. 24, 2022, pp. 1-17.
(Continued)

*Primary Examiner* — Melanie Jagannathan
(74) *Attorney, Agent, or Firm* — Kunzler Needham Hilton

(57) ABSTRACT

Apparatuses, methods, and systems are disclosed for access network selection using a selection policy rule with network slice selection assistance information. One apparatus includes a processor and a transceiver that communicates with a mobile communication network via at least one access network. The processor receives at least one WLANSP rule, the at least one WLANSP rule containing a S-NSSAI list and a selection criteria set containing at least one SSID in a preferred SSID list. The processor detects a request to establish a data connection with a first network slice in the mobile communication network over a WLAN access network. The processor selects a first WLAN access network identified by a first SSID based on the at least one WLANSP rule and establishes a data connection with the first network slice in the mobile communication network over the first WLAN access network.

16 Claims, 10 Drawing Sheets

(56) References Cited

U.S. PATENT DOCUMENTS

| | | | | |
|---|---|---|---|---|
| 2020/0404567 | A1* | 12/2020 | Tang | H04W 28/24 |
| 2021/0029253 | A1* | 1/2021 | Xu | H04L 12/1407 |
| 2021/0160186 | A1* | 5/2021 | Xu | H04W 48/14 |
| 2021/0211938 | A1* | 7/2021 | Shen | H04W 28/0992 |
| 2021/0227438 | A1* | 7/2021 | Xu | H04W 8/18 |
| 2022/0272620 | A1* | 8/2022 | Ninglekhu | H04W 40/02 |
| 2025/0024250 | A1* | 1/2025 | Xu | H04W 8/26 |

OTHER PUBLICATIONS

Motorola Mobility et al., "Access Network Selection for UEs not supporting NAS over non-3GPP access", SA WG2 Meeting #129bis S2-1811836, Nov. 26-30, 2018, pp. 1-5.

3GPP, "3rd Generation Partnership Project; Technical Specification Group Services and System Aspects; System architecture for the 5G System (5GS); Stage 2 (Release 17)", 3GPP TS 23.501 V17.1.0, Jun. 2021, pp. 1-526.

3GPP, "3rd Generation Partnership Project; Technical Specification Group Services and System Aspects; Procedures for the 5G System (5GS); Stage 2 (Release 17)", 3GPP TS 23.502 V17.0.0, Mar. 2021, pp. 1-646.

3GPP, "3rd Generation Partnership Project; Technical Specification Group Services and System Aspects; Policy and charging control framework for the 5G System (5GS); Stage 2 (Release 17)", 3GPP TS 23.503 V17.0.0, Mar. 2021, pp. 1-128.

3GPP, "3rd Generation Partnership Project; Technical Specification Group Core Network and Terminals; Non-Access-Stratum (NAS) protocol for 5G System (5GS); Stage 3; (Release 17)", 3GPP TS 24.501 V17.1.0, Dec. 2020, pp. 1-745.

3GPP, "3rd Generation Partnership Project; Technical Specification Group Core Network and Terminals; User Equipment (UE) policies for 5G System (5GS); Stage 3 (Release 17)", 3GPP TS 24.526 V17.2.0, Mar. 2021, pp. 1-53.

* cited by examiner

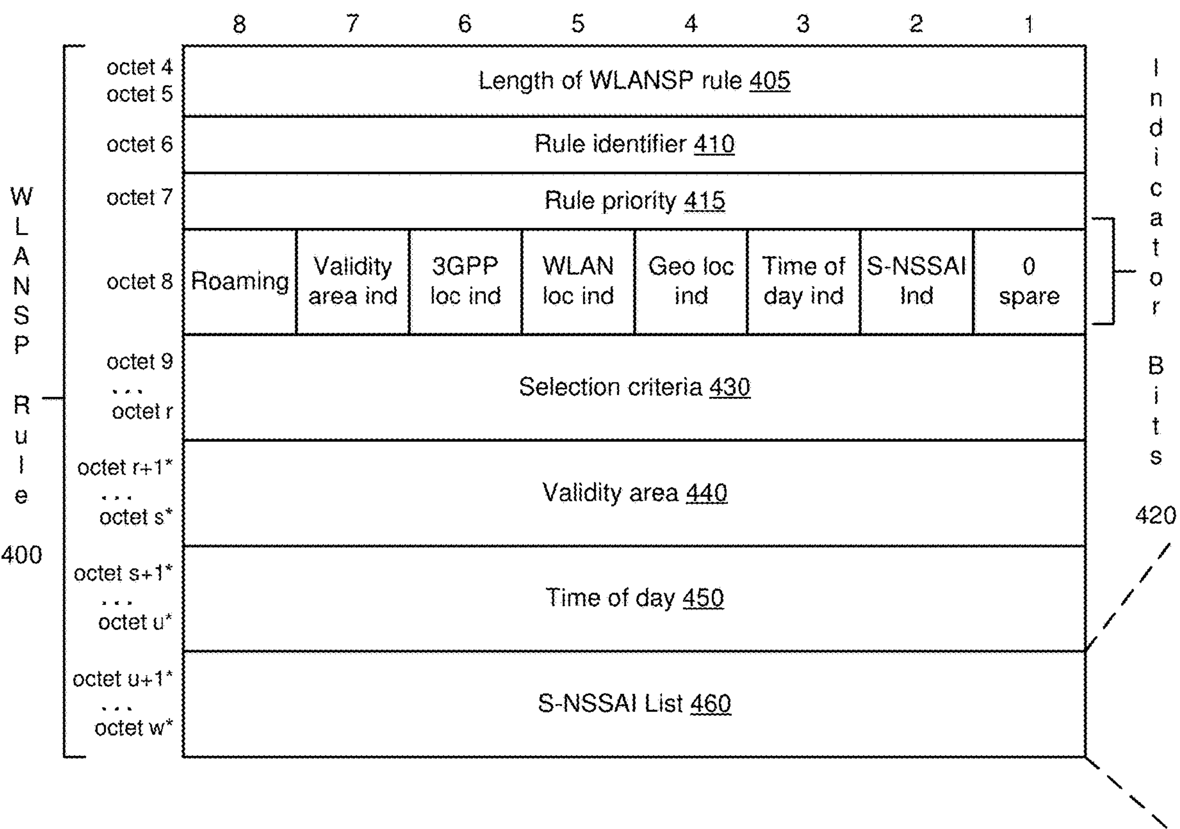
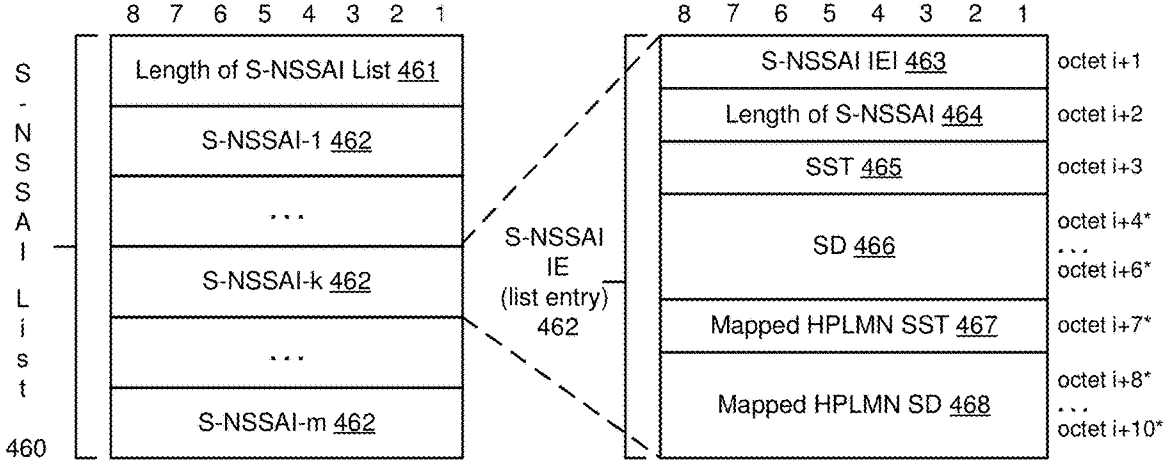
FIG. 4A

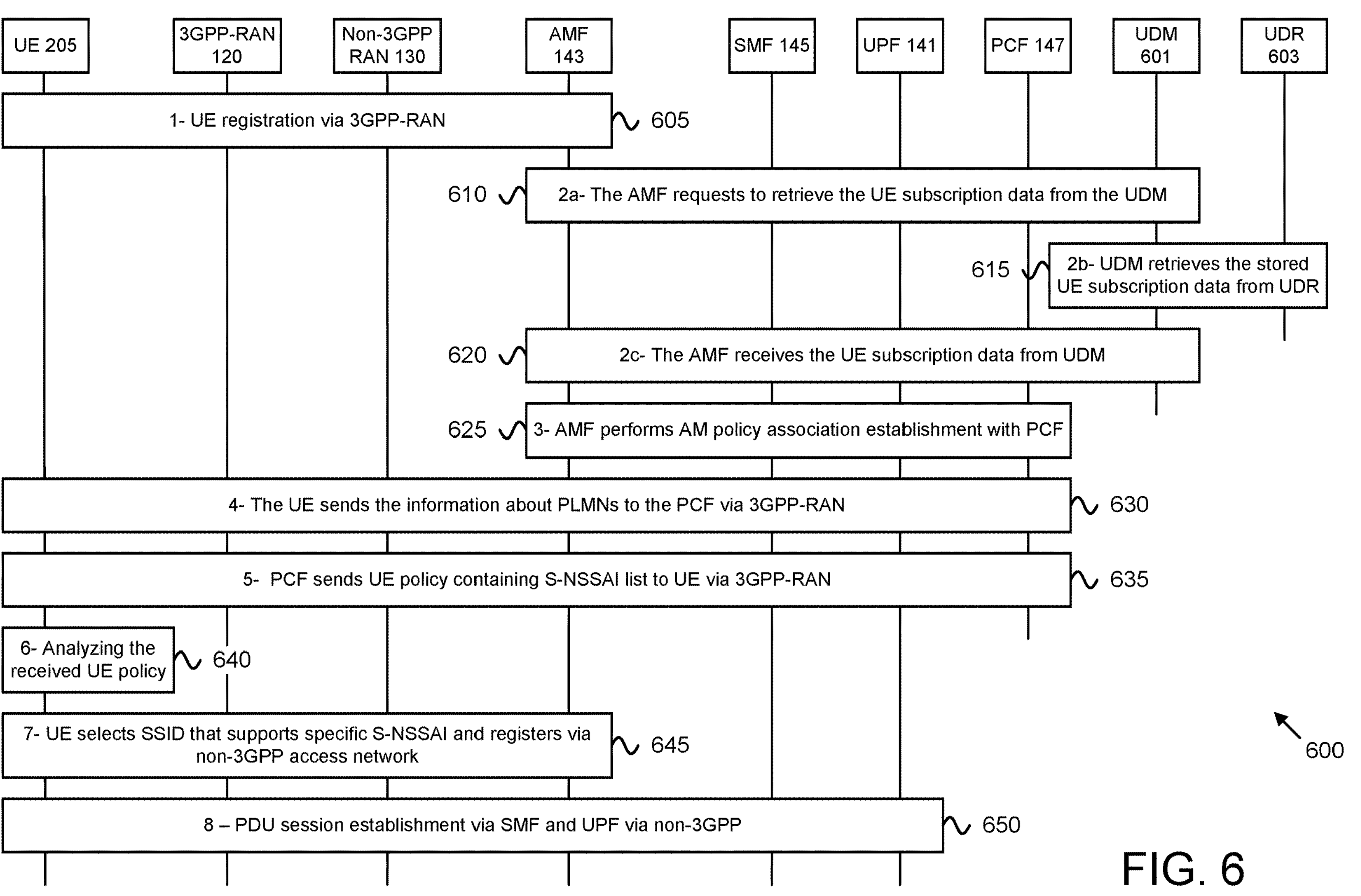

UE 205
3GPP-RAN 120
Non-3GPP RAN 130
AMF 143
SMF 145
UPF 141
PCF 147
UDM 601
UDR 603
1- UE registration via 3GPP-RAN
605
610
2a- The AMF requests to retrieve the UE subscription data from the UDM
615
2b- UDM retrieves the stored UE subscription data from UDR
620
2c- The AMF receives the UE subscription data from UDM
625
3- AMF performs AM policy association establishment with PCF
4- The UE sends the information about PLMNs to the PCF via 3GPP-RAN
630
5- PCF sends UE policy containing S-NSSAI list to UE via 3GPP-RAN
635
6- Analyzing the received UE policy
640
7- UE selects SSID that supports specific S-NSSAI and registers via non-3GPP access network
645
600
8 – PDU session establishment via SMF and UPF via non-3GPP
650
FIG. 6

ACCESS NETWORK SELECTION POLICY WITH NETWORK SLICE SELECTION ASSISTANCE INFORMATION

FIELD

The subject matter disclosed herein relates generally to wireless communications and more particularly relates to selecting an access network using a selection policy rule that contains network slice selection assistance information.

BACKGROUND

3GPP standards organization has defined in 3GPP TS 24.526, 3GPP TS 23.503 and 3GPP TS 24.501, how the network can create and transmit a set of policies to a UE to connect to a non-3GPP network which may be trusted or untrusted. The PLMN policy for a UE is sent to the UE as UE route selection policy ("URSP") rules or for the untrusted non-3GPP access network discovery and selection policy ("ANDSP"). The URSP has information about route selection descriptor ("RSD") and traffic descriptor, while the ANDSP has information about WLAN selection policy ("WLANSP") and non-3GPP access network ("N3AN") rule for accessing the untrusted non-3GPP network.

Currently when the UE connects to a non-3GPP network, the assumptions is that a non-3GPP access network supports all the S-NSSAIs, however this assumption may not be correct. Therefore, it should be considered how a UE select a non-3GPP access network that can support a specific S-NSSAI.

BRIEF SUMMARY

Disclosed are procedures for access network selection using a selection policy rule with network slice selection assistance information. Said procedures may be implemented by apparatus, systems, methods, and/or computer program products.

One method of a User Equipment ("UE") includes receiving at least one Wireless Location Area Network Selection Policy ("WLANSP") rule, the at least one WLANSP rule containing a single network slice selection assistance information ("S-NSSAI") list and a selection criteria set containing at least one Service Set Identifier ("SSID") in a preferred SSID list. Here, the S-NSSAI list contains at least one S-NSSAI, where each S-NSSAI in the S-NSSAI list identifies a network slice in a mobile communication network and where each SSID in the preferred SSID list supports connectivity to every S-NSSAI in the S-NSSAI list. The method includes detecting a request to establish a data connection with a first network slice in the mobile communication network over a Wireless Location Area Network ("WLAN") access network, where the first network slice is identified by a first S-NSSAI. The method includes selecting a first WLAN access network identified by a first SSID based on the at least one WLANSP rule and establishing a data connection with the first network slice in the mobile communication network over the first WLAN access network.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4A is a diagram illustrating one embodiment of a WLANSP rule and details thereof;

FIG. 6 is a signal flow diagram illustrating one embodiment of a procedure for PDU session establishment by using an S-NSSAI while the UE is connected to the non-3GPP network via a selected SSID associated to the S-NSSAI;

DETAILED DESCRIPTION

Figure 1:
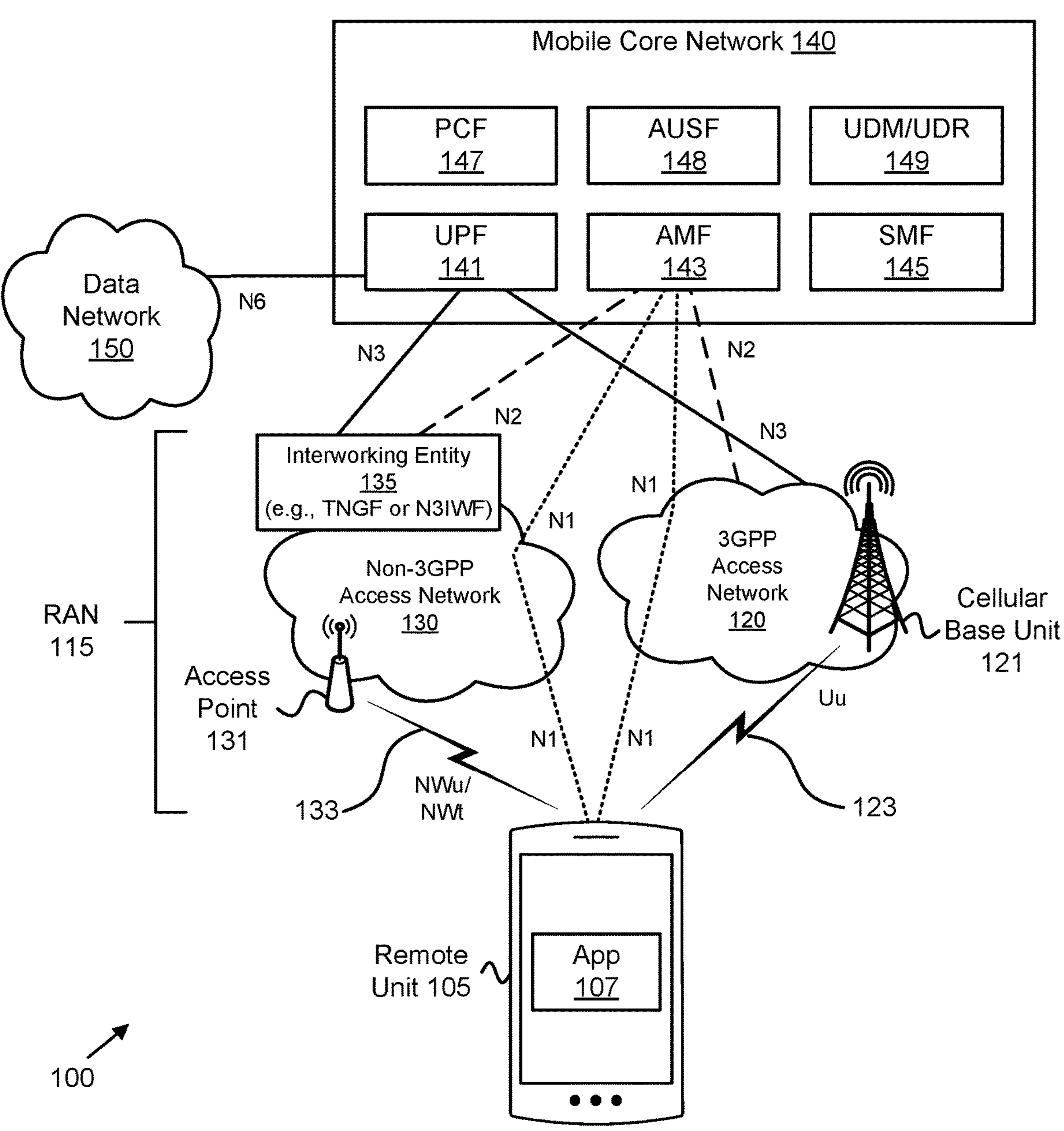
FIG. 1 is a schematic block diagram illustrating one embodiment of a wireless communication system for access network selection using a selection policy rule with network slice selection assistance information.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for access network selection using a selection policy rule with network slice selection assistance information. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

3GPP standards organization has defined in 3GPP TS 24.526, 3GPP TS 23.503 and 3GPP TS 24.501, how the network can create and transmit a set of policies to a UE to connect to a non-3GPP network which may be trusted or untrusted. The PLMN policy for a UE is sent to the UE as UE route selection policy ("URSP") rules or for the untrusted non-3GPP access network discovery and selection policy ("ANDSP"). The URSP has information about route selection descriptor ("RSD") and traffic descriptor, while the ANDSP has information about WLAN selection policy ("WLANSP") and non-3GPP access network ("N3AN") rule for accessing the untrusted non-3GPP network.

The route selection descriptors ("RSDs") are described in 3GPP TS 24.526 and comprise components such as types for session and service continuity ("SSC") mode, single network slice selection assistance information ("S-NSSAI"), data network name ("DNN"), packet data unit ("PDU") session type, preferred access type, multi-access preference, non-seamless non-3GPP offload indication, location criteria and time window.

The traffic descriptors are described in 3GPP TS 24.526 and comprises components such as types for match-all, Operating System Identity ("OS Id") plus Operating System Application Identity ("OS App Id"), IPv4 remote address, IPv6 remote address/prefix length, protocol identifier/next header, single remote port, remote port range, Internet Protocol ("IP") 3 tuple, security parameter index, type of service/traffic class, flow label, destination Medium Access Control ("MAC") address, 802.1Q customer tag ("C-TAG") virtual local area network Identifier ("VID"), 802.1Q service tag ("S-TAG") VID, 802.1Q C-TAG Priority Code Point/ Drop Eligible Indicator ("PCP/DEI"), 802.1Q S-TAG PCP/ DEI, ethertype, Data Network Name ("DNN"), connection capabilities type, destination Fully Qualified Domain Name ("FQDN"), regular expression, OS App Id.

The relationship between the route selection descriptors and the traffic descriptor may be many-to-one; meaning one or more route selection descriptors and one traffic descriptor may be in in one URSP rule.

The N3AN rule comprises information for one or more WLANSP rules and non-3GPP interworking function ("N3IWF") or information for evolved packet data gateway ("ePDG"). The WLANSP rules comprise a selection criteria with its priority and validities for location and time for the selection criteria.

The UE policy is sent to the UE by Public Land Mobile Network ("PLMN"). In one embodiment, the UE policy part comprises a UE Routing Selection Policy ("URSP"). In another embodiment, the UE policy part comprises an ANDSP. Where UE policy part contains an ANDSP, the N3AN rule of the ANDSP may compromise either a N3IWF ID or an ePDG ID.

For the UE to establish a data flow, it may use a traffic descriptor and the related RSD, where the related RSD describes the packet data unit ("PDU") session for the data flow. Those URSP rules may be valid for establishment of the PDU session by accessing the trusted or untrusted non-3GPP network via Trusted Non-3GPP Access Network ("TNAN") or N3IWF respectively.

In order for the UE to establish a PDU session, it may use a specific S-NSSAI. The UE may be in a tracking area where the S-NSSAI is supported. The UE needs to identify service set identifier ("SSID") which can be used in the same tracking area in order to attach to the non-3GPP network and establish a PDU session by using the S-NSSAI. The procedure is described.

For a UE to utilize the information about the selection criteria which may be an SSID and the related one or more S-NSSAIs, the WLANSP rules may comprise information about the S-NSSAIs which are valid for that selection criteria which may be an SSID. Two methods are described in this context. In a first solution, a WLANSP rule may be modified to add a new validity parameter based on an S-NSSAI list. In a second solution, a S-NSSAI list may be added to the selection criteria of a WLANSP rule when the selection criteria include a preferred SSID list.

In one embodiment, the wireless communication system 100 includes at least one remote unit 105, a Radio Access Network ("RAN") 115, and a mobile core network 140. The RAN 115 and the mobile core network 140 form a mobile communication network. The RAN 115 may be composed of a 3GPP access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the RAN 115 is compliant with the Fifth-Generation ("5G") system specified in the Third Generation Partnership Project ("3GPP") specifications. For example, the RAN 115 may be a New Generation Radio Access Network ("NG-RAN"), implementing New Radio ("NR") Radio Access Technology ("RAT") and/or Long-Term Evolution ("LTE") RAT. In another example, the RAN 115 may include non-3GPP RAT (e.g., Wi-Fi® or Institute of Electrical and Electronics Engineers ("IEEE") 802.11-family compliant WLAN). In another implementation, the RAN 115 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 115 (i.e., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QOS Identifier ("5Q1").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (i.e., shared) radio spectrum.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the AMF 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network.

In certain embodiments, a non-3GPP access network 130 may be controlled by an operator of the mobile core network 140 and may contain an interworking function that provides direct access to the mobile core network 140. Such a non-3GPP access network deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP access network deployment that is not controlled by an operator (or trusted partner) of the mobile core network 140, does not have direct access to the mobile core network 140, or does not support the certain security features is referred to as a "untrusted" non-3GPP access network. An interworking entity 135 deployed in a trusted non-3GPP access network 130 may be referred to herein as a Trusted Network Gateway Function ("TNGF"). An interworking entity 135 deployed to support interworking with an untrusted non-3GPP access network 130 may be referred to herein as a non-3GPP interworking function ("N3IWF"). Note that the N3IWF is not part of the untrusted non-3GPP access network.

In one embodiment, the mobile core network 140 is a 5G core network (i.e., "5GC") or an Evolved Packet Core ("EPC") networks, which may be coupled to the packet data network 150, like the Internet and private data networks, among other data networks. A remote unit 105 may have a subscription or other account with the mobile core network 140. In various embodiments, each mobile core network 140 belongs to a single mobile network operator ("MNO"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the 5G-RAN 115, a Session Management Function ("SMF") 145, a Policy Control Function ("PCF") 147, an Authentication Server Function ("AUSF") 148, a Unified Data Management function ("UDM") and a User Data Repository ("UDR").

The UPF(s) 141 is/are responsible for packet routing and forwarding, packet inspection, QoS handling, and external PDU session for interconnecting Data Network ("DN"), in the 5G architecture. The AMF 143 is responsible for termination of Non-Access Stratum ("NAS") signaling, NAS ciphering & integrity protection, registration management, connection management, mobility management, access authentication and authorization, security context management. The SMF 145 is responsible for session management (i.e., session establishment, modification, release), remote unit (i.e., UE) Internet Protocol ("IP") address allocation & management, DL data notification, and traffic steering configuration of the UPF 141 for proper traffic routing.

The PCF 147 is responsible for unified policy framework, providing policy rules to CP functions, access subscription information for policy decisions in UDR. The AUSF 148 acts as an authentication server and allows the AMF 143 to authenticate the remote unit 105. The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include a Network Repository Function ("NRF") (which provides NF service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), or other NFs defined for the 5GC. In certain embodiments, the mobile core network 140 may include an authentication, authorization, and accounting ("AAA") server.

In various embodiments, the each of the mobile core network 140 supports different types of mobile data connections and different types of network slices, wherein each mobile data connection utilizes a specific network slice. Here, a "network slice" refers to a portion of a core network optimized for a certain traffic type or communication service. A network slice instance may be identified by a single-network slice selection assistance information ("S-NSSAI") while a set of network slices for which the remote unit 105 is authorized to use may be identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140.

While FIG. 1 depicts components of a 5G RAN and a 5G core network, the described embodiments for establishing multiple concurrent registrations with a mobile network apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The RAN 115 refers to any type of 5G access network that can provide access to the mobile core network 140, including the 3GPP access network 120 and the non-3GPP access network 130.

Figure 2:
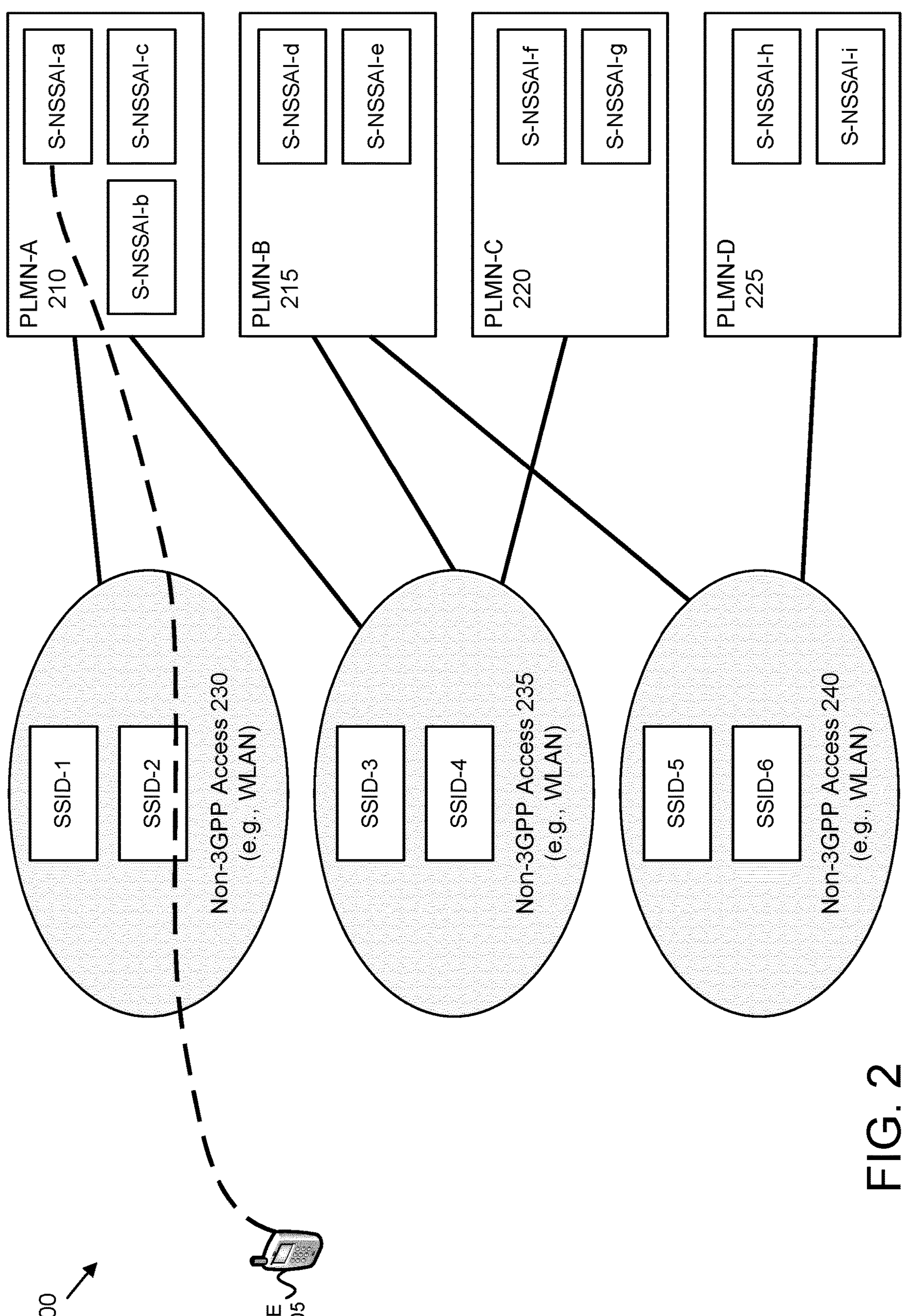
FIG. 2 is a diagram illustrating one embodiment of a network deployment supporting SSID selection for a particular network slice.

FIG. 2 depicts an example network deployment 200, according to embodiments of the disclosure. The network deployment may be one implementation of the wireless communication system 100, described above. In the depicted embodiments, the network deployment 200 includes a UE 205, which may be an implementation of the remote unit 105. The UE 205 is a subscriber of the PLMN-A 210, which may be an implementation of the mobile core network 140. The UE 205 may connect to the PLMN-A 210 via the non-3GPP access 230, which may be an implementation of the non-3GPP access network 130, described above. In the depicted embodiments, the network deployment 200 also include the non-3GPP accesses 235 and 240. In certain embodiments, the UE 205 may also connect to the PLMN-A 210 via the non-3GPP accesses 235. Moreover, the UE 205 may connect to a PLMN-B 215 via the non-3GPP access 235 and/or via the non-3GPP access 240. In the depicted embodiment, the UE 205 may also connect to the PLMN-C 220 via the non-3GPP access 235 or may connect to the PLMN-D 225 via the non-3GPP access 240.

Because all non-3GPP accesses that support connections to a particular PLMN may not be able to support all network slices (identified by S-NSSAIs) of the PLMN, the present disclosure describes how the UE 205 is to select a non-3GPP access network that can support a specific S-NSSAI. The described solutions expand the concept for the UE policy to include the S-NSSAI list in the WLANSP rules. So, if a UE is to access a non-3GPP network, the UE may use a selection criteria to access the non-3GPP, wherein the selection criteria comprise a validity that is dependent on one or more S-NSSAIs.

Figure 3:
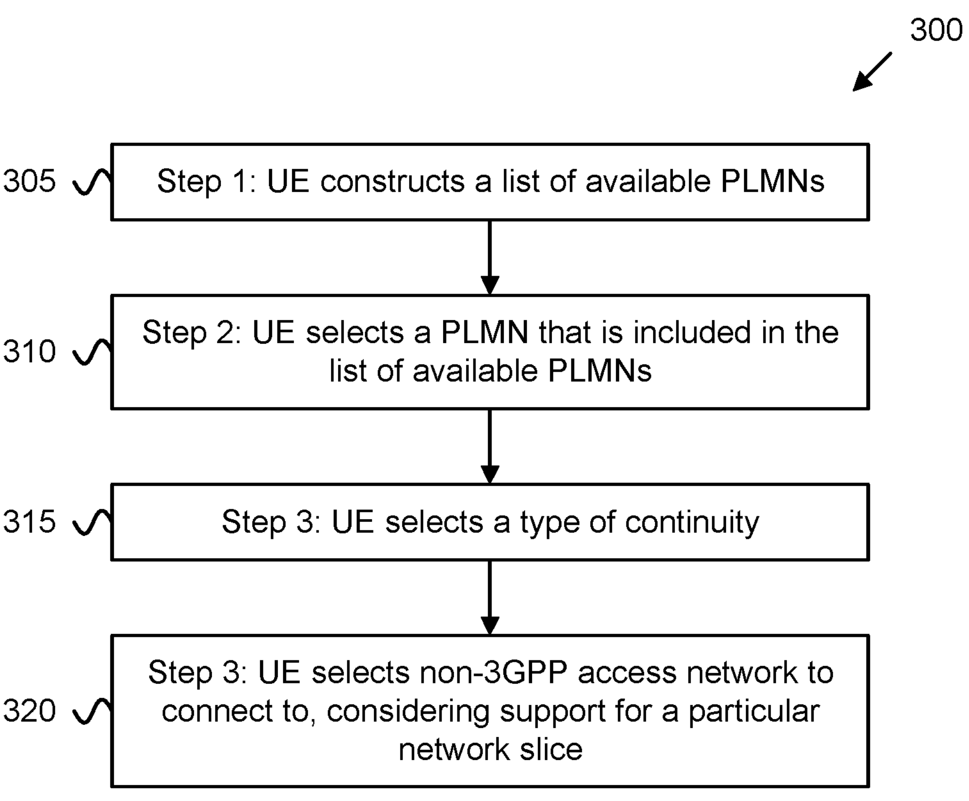
FIG. 3 is a flowchart diagram illustrating one embodiment of a procedure for access network selection.

FIG. 3 depicts a procedure 300 for Access Network Selection, according to embodiments of the disclosure. The Access Network Selection procedure 300 may be performed the UE 205. The following steps specify the UE behavior when the UE 205 wants to select and connect to a PLMN over trusted non-3GPP access. Note that the UE 205 executes these steps before connecting to a trusted non-3GPP access network. This is different from the untrusted non-3GPP access (see clause 6.3.6, "N3IWF selection"), where the UE 205 first connects to a non-3GPP access network, it obtains IP configuration and then proceeds to PLMN selection and N3IWF selection (or enhanced Packet Data Gateway ("ePDG") selection). In the case of trusted non-3GPP access, the UE 205 uses 3GPP-based authentication for connecting to a non-3GPP access, so it must first select a PLMN and then attempt to connect to a non-3GPP access.

At Step 1, the UE 205 constructs a list of available PLMNs, with which trusted connectivity is supported. This list contains the PLMNs included in the PLMN List-2 and PLMN List-3, advertised by all discovered non-3GPP access networks. For each PLMN the supported type(s) of trusted connectivity is also included.

At Step 2, the UE 205 selects a PLMN that is included in the list of available PLMNs, as follows:

If the UE 205 is already connected to a PLMN via 3GPP access and this PLMN is included in the list of available PLMNs, then the UE 205 selects this PLMN. However, if this PLMN is not included in the list of available PLMNs, but it is included in the "Non-3GPP access node selection information" in the UE 205, the UE selects this PLMN and executes a combined ePDG/N3IWF selection procedure. In certain embodiments, the combined ePDG/N3IWF selection procedure is performed as specified in clause 6.3.6.3 of 3GPP TS 23.501.

Otherwise (i.e., if the UE 205 is not connected to a PLMN via 3GPP access, or if the UE 205 is connected to a PLMN via 3GPP access but this PLMN is neither in the list of available PLMNs nor in the "Non-3GPP access node selection information"), then the UE 205 determines the country it is located in.

If the UE 205 determines to be located in its home country, then the UE 205 may select the Home PLMN ("HPLMN"), if included in the list of available PLMNs. Otherwise, the UE selects an E-HPLMN (Equivalent HPLMN) if an E-HPLMN is included in the list of available PLMNs. If the list of available PLMNs does not include the HPLMN and does not include an E-HPLMN, the UE stops the procedure and may attempt to connect via untrusted non-3GPP access (i.e., it may execute the N3IWF selection procedure specified in clause 6.3.6).

Otherwise, if the UE determines to be located in a visited country, then the UE 205 determines if it is mandatory to select a PLMN in the visited country, as follows: If the UE has IP connectivity (e.g., the UE is connected via 3GPP access), the UE sends a Domain Name Service ("DNS") query and receives a DNS response that indicates if a PLMN must be selected in the visited country. The DNS response also includes a lifetime that denotes how long the DNS response can be cached for. The FQDN in the DNS query shall be different from the Visited Country FQDN (see 3GPP TS 23.003) that is used for ePDG/N3IWF selection. The DNS response shall not include a list of PLMNs that support trusted connectivity in the visited country, but shall only include an indication of whether a PLMN must be selected in the visited country or not. Otherwise, if the UE 205 has no IP connectivity (e.g., the UE is not connected via 3GPP access), then the UE may use a cached DNS response that was received in the past, or may use local configuration that indicates which visited countries mandate a PLMN selection in the visited country.

If the UE 205 determines that it is not mandatory to select a PLMN in the visited country, and the HPLMN or an E-HPLMN is included in the list of available PLMNs, then the UE selects the HPLMN or an E-HPLMN, whichever is included in the list of available PLMNs. Otherwise, the UE selects a PLMN in the visited country by considering, in priority order, the PLMNs, first, in the User Controlled PLMN Selector list and, next, in the Operator Controlled PLMN Selector list (see 3GPP TS 23.122). The UE selects the highest priority PLMN in a PLMN Selector list that is also included in the list of available PLMNs. If the list of available PLMNs does not include a PLMN that is also included in a PLMN Selector list, then the UE 205 stops the procedure and may attempt to connect via untrusted non-3GPP access.

At Step 3, the UE 205 selects the type of trusted connectivity (i.e., "S2a connectivity" or "5G connectivity") for connecting to the selected PLMN, as follows: If the list of available PLMNs indicates that both "S2a connectivity" and "5G connectivity" is supported for the selected PLMN, then the UE shall select "5G connectivity" because it is the preferred type of trusted access.

Otherwise, if the list of available PLMNs indicates that only one type of trusted connectivity (either "S2a connectivity" or "5G connectivity") is supported for the selected PLMN, the UE selects this type of trusted connectivity.

At Step 4, the UE 205 selects a non-3GPP access network to connect to, as follows: If the UE selects (in step 3) to use "S2a connectivity" or the UE selects to use "5G connectivity" but does not want to connect to a particular network slice in the selected PLMN, then the UE 205 puts the available non-3GPP access networks in priority order. For WLAN access, the UE 205 constructs a prioritized list of WLAN access networks by using the WLANSP rules (if provided) and the procedure specified in clause 6.6.1.3 of TS 23.503. If the UE is not provided with WLANSP rules, the UE constructs the prioritized list of WLAN access networks by using an implementation specific procedure.

For other types of non-3GPP access, the UE may use access specific information to construct this prioritized list. From the prioritized list of non-3GPP access networks, the UE selects the highest priority non-3GPP access network that supports the selected type of trusted connectivity to the selected PLMN.

Otherwise, i.e., if the UE 205 selects to use "5G connectivity" and the UE 205 wants to connect to a particular network slice in the selected PLMN, then if the UE wants to select a WLAN access network, the UE is provisioned with WLANSP rules from the selected PLMN and there is a WLANSP rule containing the particular network slice in the "Supported S-NSSAI list", then the UE applies the group of selection criteria in this WLANSP rule to select an available WLAN. Each group of selection criteria in this WLANSP rule contains one or more SSIDs, which support connectivity to the particular network slice of the selected PLMN.

For example, if the UE wants to connect to a network slice of the selected PLMN, which is identified by S-NSSAI-x, and the UE contains the following WLANSP rule from the selected PLMN, then the UE selects a WLAN access network identified either with SSID-a or with SSID-b.

An example WLANSP rule is as follows:

WLANSP rule:

Group 1 of WLAN selection criteria: Preferred SSID list=SSID-a, SSID-b

Supported S-NSSAI list: S-NSSAI-x

Otherwise, the UE selects a non-3GPP access network as specified above for the case where the UE selects to use "S2a connectivity" or the UE selects to use "5G connectivity" but does not want to connect to a particular network slice.

Finally, over the selected non-3GPP access network, the UE starts the 5GC registration procedure. In some embodiments, the 5GC registration procedure is performed as specified in TS 23.502, clause 4.12a.2.2.

By applying the procedure 300 to the example network deployment depicted in FIG. 2, the UE 205 may perform the following example operation for WLAN access:

1) The UE constructs a list of available PLMNs, with which trusted connectivity is supported. As an example, the UE may construct the following list:
   a. PLMN-A: "S2a connectivity", "5G connectivity"
   b. PLMN-B: "5G connectivity"
   c. PLMN-C: "S2a connectivity", "5G connectivity"
   d. PLMN-D: "S2a connectivity"
2) The UE 205 selects a PLMN that is included in the list of available PLMNs. For example, the UE 205 may select PLMN-A 210 which supports "S2a connectivity" and "5G connectivity".
3) The UE 205 selects the type of trusted connectivity ("S2a connectivity" or "5G connectivity") for connecting to the selected PLMN. In this example, the UE 205 selects to use "5G connectivity" to connect to PLMN-c.
4) Having selected to use "5G connectivity" and wanting to connect to a particular network slice in the selected PLMN, which is identified by S-NSSAI-x, the UE 205 selects a WLAN access network as follows. Because the UE 205 is provisioned with WLANSP rules from the selected PLMN and if there is a WLANSP rule containing S-NSSAI-x in the "Supported S-NSSAI list", then the UE 205 applies the group of selection criteria in this WLANSP rule to select an available WLAN. Each group of selection criteria in this WLANSP rule contains one or more SSIDs which support connectivity to a network slice of the selected PLMN, identified by S-NSSAI-x.

Figure 4B:
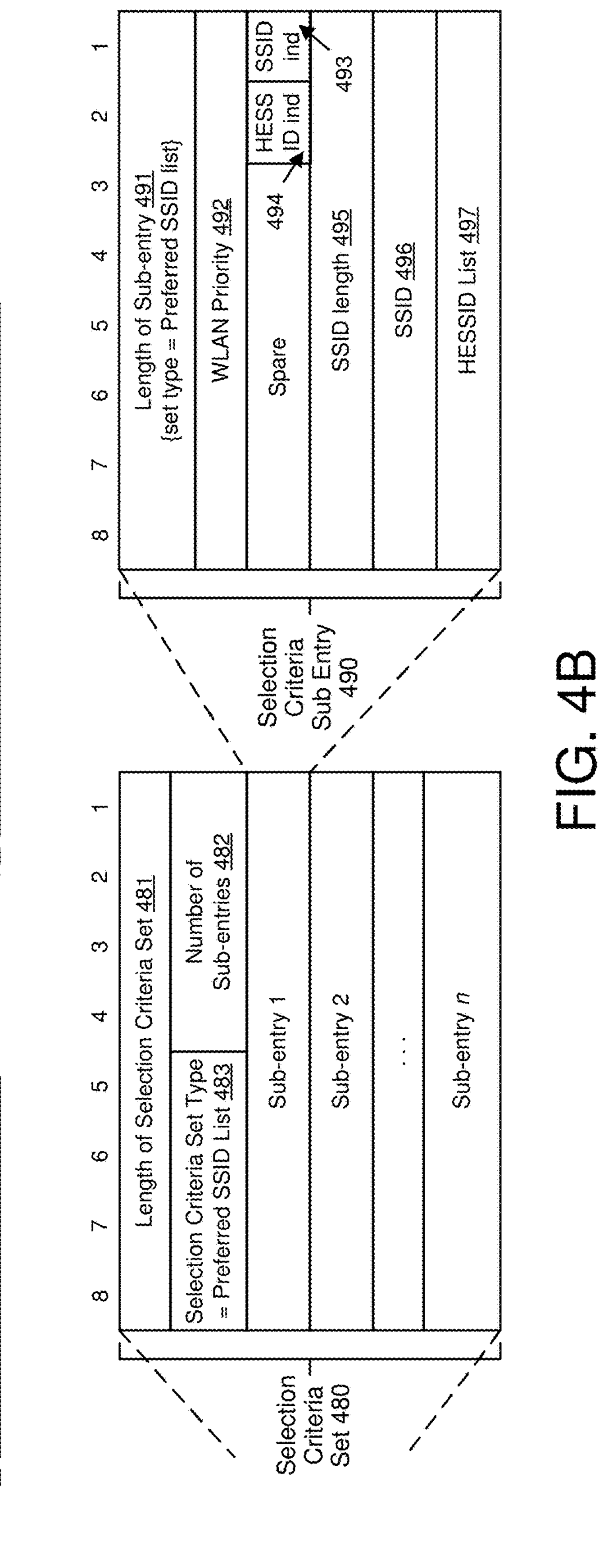
FIG. 4B is a diagram illustrating additional details of the WLANSP rule depicted in FIG. 4A.

FIGS. 4A-4B depicts one example of a WLANSP rule 400, according to embodiments of the disclosure. FIG. 4A depicts the overall arrangement of the WLANSP rule 400. The WLANSP rule 400 is part of the ANDSP received at the UE 205 and comprises the information to access the network. Note that the WLANSP is used to control UE behavior related to selection and reselection of a WLAN.

As illustrated in FIG. 4A, the WLANSP rule 400 comprises length field 405 to indicate an overall length of the WLANSP rule 400, an identifier field 410 to identify this WLANSP rule 400, and a priority field 415 to indicate the priority of this WLANSP rule 400. The WLANSP rule identifier and rule priority may be as described in 3GPP TS 24.526.

Additionally, because the validity of the WLANSP rule 400 may be restricted by validity conditions, the WLANSP rule 400 includes a set of indicator bits 420 that indicate whether various validity conditions apply. Here, each validity condition must be met to make the WLANSP rule 400 valid. Note that there can be multiple valid WLANSP rules at the same time. The roaming indicator bit 421 indicates whether the WLANSP rule 400 is only valid when the UE 205 is not roaming. Alternatively, the roaming indicator bit 421 may indicate whether the WLANSP rule 400 is only valid when the UE 205 is roaming.

The validity area indicator bit 422 indicates whether the validity of the WLANSP rule 400 is restricted to specific area(s). Note that a positive indication (e.g., bit set to '1') also indicates that a validity area field 440 is present in the WLANSP rule 400, while a negative indication (e.g., bit set to '0') also indicates that no validity area field 440 is present in the WLANSP rule 400.

The 3GPP location indicator bit 423 indicates whether the validity area is defined using 3GPP locations (i.e., tracking areas, registration areas, cells, etc.). The WLAN location indicator bit 424 indicates whether the validity area is defined using WLAN(s). The Geo-location indicator bit 425 indicates whether the validity area of the WLANSP rule 400 is defined using specific geographic location(s).

The time of day indicator bit 426 indicates whether the validity of the WLANSP rule 400 is restricted to specific time(s) of day. Here, a positive indication (e.g., bit set to '1') also indicates that a Time of day field 450 is present in the WLANSP rule 400, while a negative indication (e.g., bit set to '0') also indicates that no time of day field 450 is present in the WLANSP rule 400.

Note that the WLANSP rule 400 includes a S-NSSAI indicator bit 427 which indicates whether the validity of the WLANSP rule 400 is restricted to specific S-NSSAIs. Here, a positive indication (e.g., bit set to '1') also indicates that a S-NSSAI list field 460 is present in the WLANSP rule 400, while a negative indication (e.g., bit set to '0') also indicates that no S-NSSAI list field 460 is present in the WLANSP rule 400.

The WLANSP rule 400 includes a selection criteria 430, the details of which are described below with reference to FIG. 4B. As mentioned above, the WLANSP rule 400 may optionally include various validity areas 440 indicating where this WLANSP rule may be valid. The WLANSP rule 400 may optionally include a Time of day field 450, indicating the time of the day this WLANSP rule is valid. Each entry in the Time of day field 450 may include a TimeStart value, a TimeStop value, a DateStart value, a DateStop value, and a DayOfWeek value, as described in section 4.3.2 of 3GPP 24.526.

FIG. 4A additionally shows details of the new element of a S-NSSAI list 460 and details of an entry in the S-NSSAI list. A valid S-NSSAI list 460 comprises one or more S-NSSAIs, where the one or more S-NSSAIs are defined according to subclause 9.11.2.8 of 3GPP TS 24.501. In some embodiments, the UE 205 may register to the 3GPP network and get the UE policy containing the WLANSP rule with S-NSSAI list. The UE 205 may use the information in the received UE policy to register via a non-3GPP access with a validity for a selected S-NSSAI list. The UE 205 may then use one or more S-NSSAIs in the S-NSSAI list for the PDU session establishment, as described below with reference to FIG. 6.

As depicted, the S-NSSAI list 460 includes a length of list field 461 and at least one S-NSSAI information element ("IE") 462. Each S-NSSAI IE 462 includes an IE identifier field 463, a length of contents field 464, and a Slice/Service Type ("SST") field 465 which refers to the expected Network Slice behavior in terms of features and services. A S-NSSAI IE 462 may optionally include a Slice Differentiator ("SD") field 466 which is optional information that complements the SST(s) to differentiate amongst multiple Network Slices of the same SST. Because the particular SST and SD values in the serving PLMN may differ from those used by the HPLMN of the UE 205, the S-NSSAI IE 462 may optionally include a mapped HPLMN SST value 467 and a mapped HPLMN SD value 468. These mapped values allow the UE 205 to identify S-NSSAI in the serving PLMN that correspond to specific S-NSSAI in the HPLMN.

FIG. 4B shows details of the selection criteria 430, including details of a selection criteria entry, of a selection criteria set, and associated sub-entry. The length of selection criteria field 431 (i.e., octets 9-10) indicates the length of subsequent fields in the selection criteria. The Number of Selection Criteria Entries field 432 (i.e., octets 11) indicates the number of individual selection criteria entries 470 (i.e., octets 12 to r) contained in the selection criteria 430.

For each selection criteria entry 470 (also referred to as a "selection criterion"), the Length of selection criteria entry field 471 (i.e., octets 12 to 13) indicates the length of subsequent fields in the selection criteria entry. For the Criteria priority field 472 (i.e., bits 1-5 of octet 14), a lower value indicates that the selection criterion 470 has a higher priority among the selection criteria in the WLANSP rule 400. The home network indicator bit 473 (i.e., bit 6 of octet 14) indicates whether WLANs that are not operated by the home operator can be considered a match for the selection criteria entry 470. In certain embodiments, a negative indication (e.g., bit set to '0') signals that all WLANs could match this selection criteria entry 470, whereas a positive indication (e.g., bit set to '1') signals that only the WLANs that are operated by the home operator could match this selection criteria entry 470.

The MaxBSSload indicator bit 474 (i.e., bit 7 of octet 14) indicates whether a maximum Basic Service Set ("BSS") load value field 475 is present. For example, a positive indication (e.g., bit set to '1') indicates that the maximum BSS load value field 475 is present. The maximum BSS load value field 475 (i.e., octets 15 to 16) is a configurable traffic load threshold, e.g., based on the maximum acceptable BSS load of a WLAN access point. Each selection criteria entry 470 contains one or more selection criteria sets 480 containing the contents of a specific criteria set.

For each selection criteria set 480, the length of selection criteria set field 481 (i.e., octet 18) indicates the length of subsequent fields in the selection criteria entry and the number of Sub-entries field 482 (i.e., bits 1-4 of octet 19) indicates the number of individual sub-entries 490 contained in the selection criteria set 480. The Selection Criteria Set Type field 483 (i.e., bits 5-8 of octet 19) indicates the specific type of criteria set. In the depicted embodiment, the selection criteria set 480 is a preferred SSID list, e.g., is coded as '0 0 0 1'.

The selection criteria sub entry 490 when set type is "preferred SSID list" is coded as follows: the Length of sub entry field 491 (i.e., octet 20) indicates length of subsequent fields in the selection criteria sub entry. For the WLAN priority field 492 (i.e., octet 21), a lower WLAN priority value indicates the WLAN having the higher priority among the WLANs in the preferred SSID list.

The SSID indicator 493 (i.e., bit 1 of octet 22) signals whether the SSID field 496 (i.e., octets 22 to ce) is present. The SSID length field 495 (i.e., octet 23) indicates the length of the SSID field 496. The SSID field 496 is an Octet String which can have a maximum length of 32 octets, e.g., as defined in IEEE Std 802.11.

The Homogenous Extended Service Set Identifier ("HESSID") indicator 494 (i.e., bit 2 of octet 22) signals whether the HESSID field 497 (i.e., octets ee+1 to ff) is present. The HESSID field 497 is a 6 octet MAC address that identifies the homogeneous Extended Service Set ("ESS"), e.g., as defined in IEEE Std 802.11.

Figure 5:
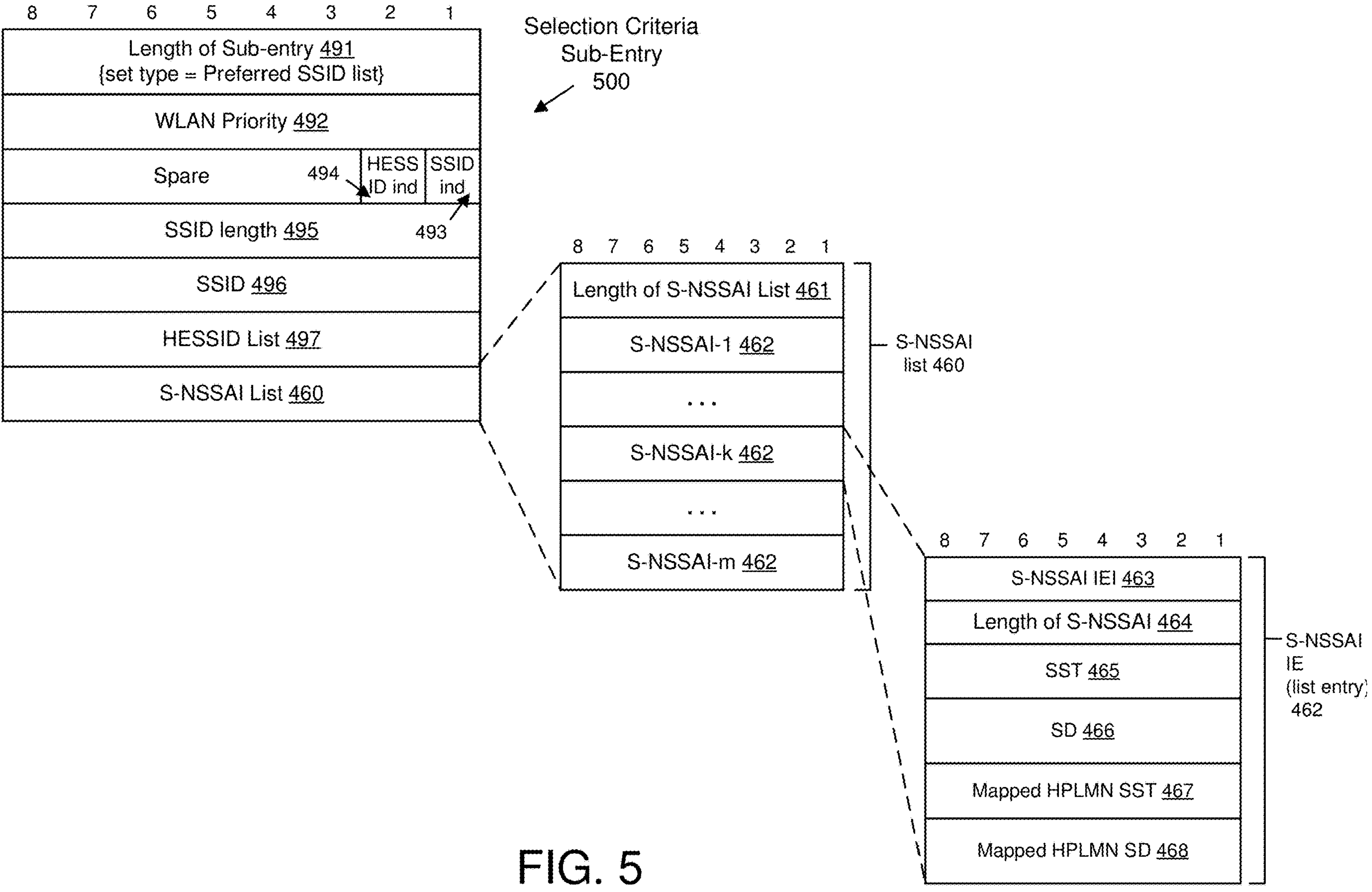
FIG. 5 is a diagram illustrating one embodiment of selection criteria of a WLANSP rule.

FIG. 5 depicts an alternate example of a selection criteria subentry 500 from a selection criteria set in a WLANSP rule, according to embodiments of the disclosure. According to embodiments of the second solution, the S-NSSAI list 460 may be an element of the selection criteria subentry 500. In some embodiments, the subentry 500 of the selection criteria set (e.g., set 480) when the selection criteria set type is set to preferred SSID list, is expanded to add the S-NSSAI list as illustrated in FIG. 5.

FIG. 5 illustrates the subentry 500 comprising an S-NSSAI list 460 after the HESSID field 497. As discussed above with reference to FIG. 4A, the S-NSSAI list 460 comprises one or more S-NSSAI IEs 470, where the one or more S-NSSAIs are defined.

According to the second solution, the UE 250 may register to the 3GPP network and get the UE policy. The UE 205 may use the information in the received UE policy to register via non-3GPP access with a validity for a selected S-NSSAI list 460. The UE 205 may then use one or more S-NSSAIs in the S-NSSAI list 460 for the PDU session establishment.

FIG. 6 depicts signaling flow of a procedure 600 for PDU session establishment by using an S-NSSAI while the UE is connected to the non-3GPP network via a selected SSID associated to the S-NSSAI, according to embodiments of the disclosure. The procedure 600 involves the UE 205, the 3GPP-RAN 120, the Non-3GPP-RAN 130, the AMF 143, the SMF 145, the UPF 141, the PCF 147, a UDM 601 and a UDR 603. Here, the AMF 143, SMF 145, UPF 141, PCF 147, UDM 601 and UDR 603 are network functions in a 5GC, wherein the UE 205 may register with a network slice in the 5GC via the non-3GPP RAN 130.

As discussed above, the UE 205 may analyze the contents of the WLANSP to find the sub entries for the selection criteria with the type Preferred SSID list, which are valid for one or more S-NSSAIs. Those access points with those SSID may be used to connect to a non-3GPP network 130 in order to establish a PDU session in the non-3GPP network 130 with the associated one or more S-NSSAIs. The detailed description of the FIG. 6 is as follows:

At Step 1, the UE 205 registers to the 5G System ("5GS") via the 3GPP RAN 120 (see block 605).

At Step 2*a*, the Access and Mobility Management Function ("AMF") 143 may create the UE context and therefore it may request the subscription data from the Unified Data Management ("UDM") 601 (see block 610).

At Step 2*b*, the UDM 601 may need to retrieve this information from the stored subscription information data in the Unified Data Repository ("UDR") 603 (see block 615). At Step 2*c*, once retrieved from the UDR 603, the AMF 143 receives the UE subscription data from the UDM 601 (sec block 620). In various embodiments, this UE subscription data includes the access and mobility subscription, Session and Mobility Management Function ("SMF") selection subscription data, UE context in SMF data and location services ("LCS") mobile origination for the UE location information, (see, e.g., 3GPP TS 23.502).

At Step 3, based on the local policy, the AMF 143 may perform access and mobility management policy association establishment by sending to the Policy Control Function ("PCF") 147 information about the serving network (see block 625). Said information about the serving network may be in form of Subscription Permanent Identifier ("SUPI"), subscription notification indication and Service Area Restrictions, the Allowed NSSAI, Access Type and RAT Type, Permanent Equipment Identifier ("PEI"), UE time zone and Serving Network's PLMN ID, or PLMN ID/Network Identifier ("NID"), see, e.g., 3GPP TS 23.501 and 3GPP TS 23.502.

At Step 4, the UE 205 may send information to the PCF 147 about the preconfigured PLMNs (see block 630). Here, the information about the preconfigured PLMNs may be in the form of a UE Policy Section Identifier ("UPSI") list, e.g., as defined in Annex D of 3GPP TS 24.501.

At Step 5, the PCF 147 retrieves the UE policy information and transmits that towards the UE 205 via the AMF 143 with the content of the UE policy information being transparent to the AMF 143 (see block 635).

According to embodiments of the first solution, the UE policy comprises WLANSP rules where a WLANSP rule comprises selection criteria with the type as "Preferred SSID list" and may comprise:

- S-NSSAI list indicator set to "1"; and
- A S-NSSAI list comprising the valid S-NSSAI for that selection criteria with the type as "Preferred SSID list."

As an example of this first solution, the UE 205 may be configured with the following WLANSP rules:

1) WLANSP rule 1
   a. Validity conditions: Slice=S-NSSAI-b
   b. Selection criteria: PreferredSSIDList=SSID-1, SSID-3
2) WLANSP rule 2
   a. Validity conditions: Slice=S-NSSAI-a, S-NSSAI-c
   b. Selection criteria: PreferredSSIDList=SSID-2, SSID-3
3) WLANSP rule 3
   a. . . .

Alternatively, according to embodiments of the second solution, the UE policy comprises WLANSP rules where a WLANSP rule comprises selection criteria with the type as "Preferred SSID list," where each sub-entry may comprise an SSID and associated S-NSSAI list comprising one or more S-NSSAIs.

As an example of this second solution, the UE 205 may be configured with the following WLANSP rules:

1) WLANSP rule 1
   a. Selection criteria: PreferredSSIDList=SSID-1, SSID-3, Slice=S-NSSAI-b
2) WLANSP rule 2
   a. Selection criteria: PreferredSSIDList=SSID-2, SSID-3, Slice=S-NSSAI-a, S-NSSAI-c
3) WLANSP rule 3
   a. . . .

At Step 6, the UE 205 analyzes the received policy and may use the information in WLANSP by collecting one or more SSIDs and one or more associated S-NSSAIs (see block 640).

At Step 7, the UE 205 may use the collection from the previous step to choose an SSID with the one or more associated S-NSSAIs to register to the 5GS via a trusted non-3GPP network 130 via a Trusted Non-3GPP Gateway Function ("TNGF"). Alternative, the UE 205 may choose an SSID to register to the 5GC via an untrusted non-3GPP network via a N3IWF.

At Step 8, the UE 205 may use the collection from previous step to choose the one or more S-NSSAIs to establish a PDU session.

Because the UE 205 wants to select an SSID that supports access to S-NSSAI-a, the UE 205 applies the WLANSP rule 2 and selects, e.g., a highest priority SSID, such as SSID-2. Note that the WLANSP rule 1 is not valid because it does not support access to S-NSSAI-a.

Figure 7:
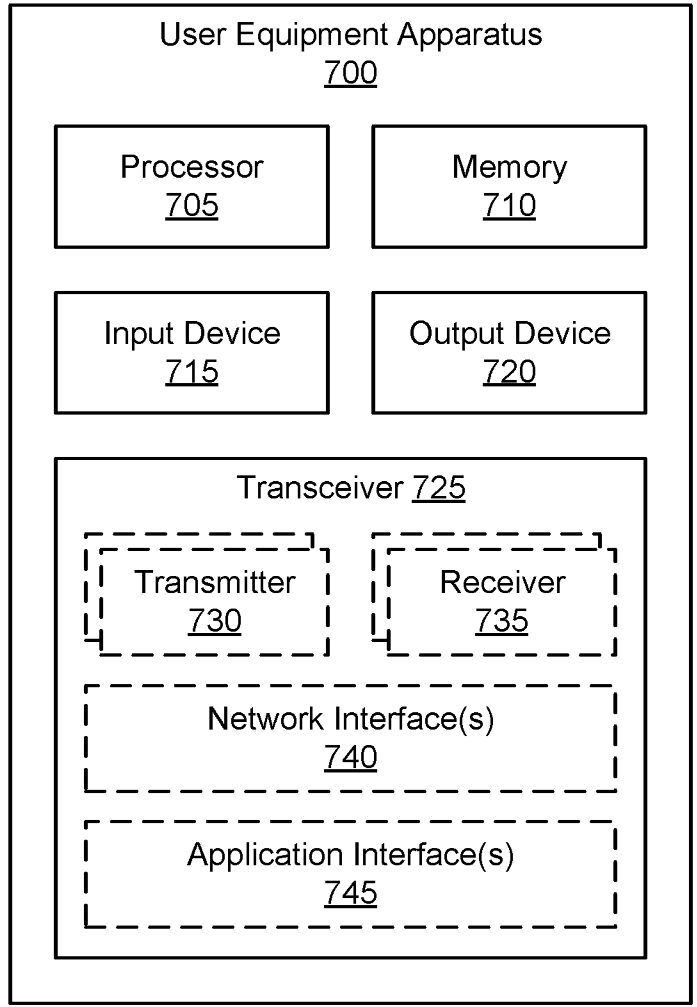
FIG. 7 is a block diagram illustrating one embodiment of a user equipment apparatus that may be used for access network selection using a selection policy rule with network slice selection assistance information.

FIG. 7 depicts a user equipment apparatus 700 that may be used for access network selection using a selection policy rule with network slice selection assistance information, according to embodiments of the disclosure. In various embodiments, the user equipment apparatus 700 is used to implement one or more of the solutions described above. The user equipment apparatus 700 may be one embodiment of the remote unit 105 and/or the UE 205, described above. Furthermore, the user equipment apparatus 700 may include a processor 705, a memory 710, an input device 715, an output device 720, and a transceiver 725.

In some embodiments, the input device 715 and the output device 720 are combined into a single device, such as a touchscreen. In certain embodiments, the user equipment apparatus 700 may not include any input device 715 and/or output device 720. In various embodiments, the user equipment apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. In some embodiments, the transceiver 725 communicates with one or more cells (or wireless coverage areas) supported by one or more base units 121. In various embodiments, the transceiver 725 is operable on unlicensed spectrum. Moreover, the transceiver 725 may include multiple UE panel supporting one or more beams. Additionally, the transceiver 725 may support at least one network interface 740 and/or application interface 745. The application interface(s) 745 may support one or more APIs. The network interface(s) 740 may support 3GPP reference points, such as NWt, NWu, Uu, N1, etc. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725. In certain embodiments, the processor 705 may include an application processor (also known as "main processor") which manages application-domain and operating system ("OS") functions and a baseband processor (also known as "baseband radio processor") which manages radio functions.

In various embodiments, the processor 705 controls the user equipment apparatus 700 to implement the above described UE behaviors. For example, using the transceiver 725 the processor 705 may receive at least one WLANSP rule, each WLANSP rule containing a S-NSSAI list and a selection criteria set containing at least one SSID in a preferred SSID list. Here, the S-NSSAI list contains at least one S-NSSAI, where every S-NSSAI in the list identifies a network slice in the mobile communication network and where each SSID in the preferred SSID list supports connectivity to every S-NSSAI in the S-NSSAI list. Note that the WLANSP rule(s) may be contained within the ANDSP.

The processor 705 detects a request to establish a data connection (e.g., a PDU Session) with a first network slice in the mobile communication network over a WLAN access network, where the first network slice is identified by a first S-NSSAI. The processor 705 further selects a first WLAN access network identified by a first SSID based on the at least one WLANSP rule and establishes a data connection with the first network slice in the mobile communication network over the first WLAN access network.

In some embodiments, selecting the first WLAN access network includes: A) identifying a first WLANSP rule which contains the first S-NSSAI in its S-NSSAI list, B) constructing a list of available SSIDs, and C) selecting the first SSID as a highest priority SSID in the preferred SSID list of the first WLANSP rule that is also contained in the list of available SSIDs. In some embodiments, the at least one WLANSP rule contains an S-NSSAI list indicator, said indicator indicating whether the WLANSP rule comprises the S-NSSAI list.

In some embodiments, wherein the at least one WLANSP rule is not usable when connectivity is required with a network slice having an S-NSSAI not contained in the S-NSSAI list of the at least one WLANSP rule. In some embodiments, the processor 705 registers with the mobile communication over the first WLAN access network prior to establishing the data connection with the first network slice, wherein the registration allows the first S-NSSAI. In some embodiments, the data connection with the first network slice comprises a PDU session, where the first WLAN access network is a trusted WLAN access network.

In some embodiments, the processor 705 registers with the mobile communication network via a 3GPP access network, wherein receiving the at least one WLANSP rule occurs after successful registration via the 3GPP access network. In some embodiments, the at least one WLANSP rule is received from a PCF in the mobile communication network. In some embodiments, the request to establish a data connection with a first network slice is generated by one of: a UE application, and a URSP rule in the UE, where the URSP rule indicates that the data connection with the first network slice should be established over a non-3GPP access network.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to mobile operation. For example, the memory 710 may store various parameters, configurations, resource assignments, policies, and the like as described above. In certain embodiments, the memory 710 also stores program code and related data, such as an operating system or other controller algorithms operating on the user equipment apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 720 may include a wearable display separate from, but communicatively coupled to, the rest of the user equipment apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 communicates with one or more network functions of a mobile communication network via one or more access networks. The transceiver 725 operates under the control of the processor 705 to transmit messages, data, and other signals and also to receive messages, data, and other signals. For example, the processor 705 may selectively activate the transceiver 725 (or portions thereof) at particular times in order to send and receive messages.

The transceiver 725 includes at least transmitter 730 and at least one receiver 735. One or more transmitters 730 may be used to provide UL communication signals to a base unit 121, such as the UL transmissions described herein. Similarly, one or more receivers 735 may be used to receive DL communication signals from the base unit 121, as described herein. Although only one transmitter 730 and one receiver 735 are illustrated, the user equipment apparatus 700 may have any suitable number of transmitters 730 and receivers 735. Further, the transmitter(s) 730 and the receiver(s) 735 may be any suitable type of transmitters and receivers. In one embodiment, the transceiver 725 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 725, transmitters 730, and receivers 735 may be implemented as physically separate components that access a shared hardware resource and/or software resource, such as for example, the network interface 740.

In various embodiments, one or more transmitters 730 and/or one or more receivers 735 may be implemented and/or integrated into a single hardware component, such as a multi-transceiver chip, a system-on-a-chip, an Application Specific Integrated Circuit ("ASIC"), or other type of hardware component. In certain embodiments, one or more transmitters 730 and/or one or more receivers 735 may be implemented and/or integrated into a multi-chip module. In some embodiments, other components such as the network interface 740 or other hardware components/circuits may be integrated with any number of transmitters 730 and/or receivers 735 into a single chip. In such embodiment, the transmitters 730 and receivers 735 may be logically configured as a transceiver 725 that uses one more common control signals or as modular transmitters 730 and receivers 735 implemented in the same hardware chip or in a multi-chip module.

Figure 8:
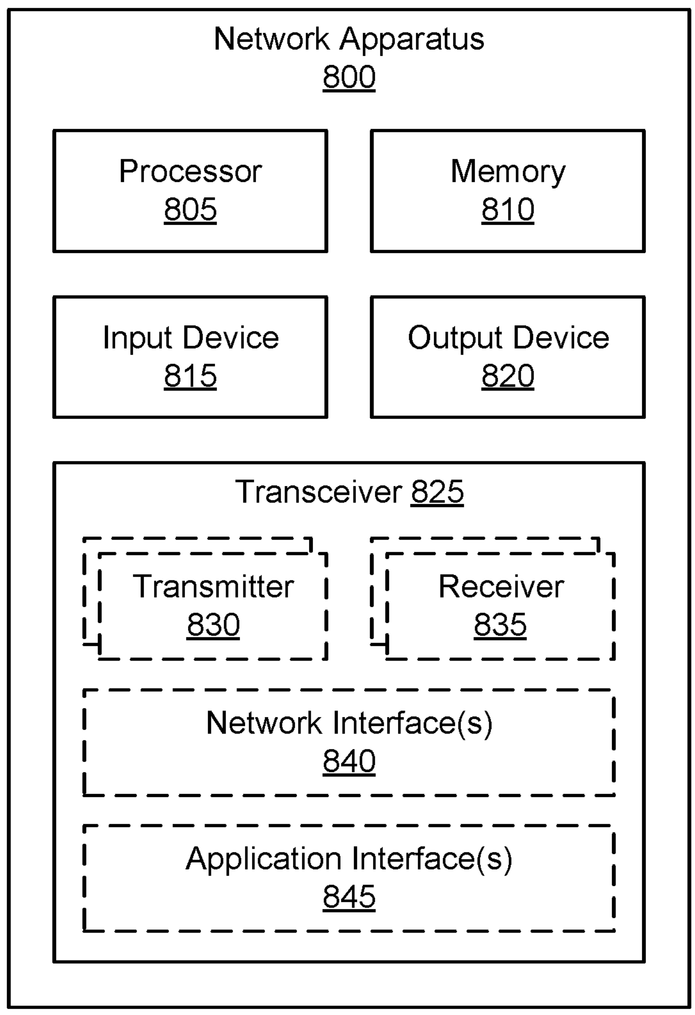
FIG. 8 is a block diagram illustrating one embodiment of a network apparatus that may be used for access network selection using a selection policy rule with network slice selection assistance information.

FIG. 8 depicts a network apparatus 800 that may be used for access network selection using a selection policy rule with network slice selection assistance information, according to embodiments of the disclosure. In one embodiment, network apparatus 800 may be one implementation of an access management function in a mobile communication network, such as the AMF 143, described above. Furthermore, the network apparatus 800 may include a processor 805, a memory 810, an input device 815, an output device 820, and a transceiver 825.

In some embodiments, the input device 815 and the output device 820 are combined into a single device, such as a touchscreen. In certain embodiments, the network apparatus 800 may not include any input device 815 and/or output device 820. In various embodiments, the network apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. Here, the transceiver 825 communicates with one or more remote units 105. Additionally, the transceiver 825 may support at least one network interface 840 and/or application interface 845. The application interface(s) 845 may support one or more APIs. The network interface(s) 840 may support 3GPP reference points, such as NWu, Uu, N1, N2, N3, N4, etc.

Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a CPU, a GPU, an auxiliary processing unit, a FPGA, or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825. When implementing a RAN node, the processor 805 may include an application processor (also known as "main processor") which manages application-domain and operating system ("OS") functions and a baseband processor (also known as "baseband radio processor") which manages radio functions.

In various embodiments, the processor 805 controls the network apparatus 800 to implement the above described PCF behaviors. For example, via the network interface 840 the processor 805 may send at least one WLANSP rule, the at least one WLANSP rule containing a S-NSSAI list and a selection criteria set containing at least one SSID in a preferred SSID list. Here, the S-NSSAI list contains at least on S-NSSAI, where every S-NSSAI in the list identifies a network slice in a mobile communication network and where each SSID in the preferred SSID list supports connectivity to every S-NSSAI in the S-NSSAI list.

In various embodiments, the processor 805 controls the network apparatus 800 to implement the above described N3AN behaviors. For example, via the transceiver 825 the processor 805 may receive a request to register with a mobile communication network using a first slice, e.g., identified by a first S-NSSAI, and perform a registration procedure. Additionally, the processor 805 may receive (e.g., via the transceiver 825) a request to establish a data connection with the first network slice (e.g., a PDU Session Establishment request containing the first S-NSSAI) and perform a data connection establishment procedure (e.g., PDU Session Establishment procedure).

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to access network selection using a selection policy rule with network slice selection assistance information. For example, the memory 810 may store parameters, configurations, resource assignments, policies, and the like, as described above. In certain embodiments, the memory 810 also stores program code and related data, such as an operating system or other controller algorithms operating on the network apparatus 800.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the network apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

The transceiver 825 includes at least transmitter 830 and at least one receiver 835. One or more transmitters 830 may be used to communicate with the UE, as described herein. Similarly, one or more receivers 835 may be used to communicate with network functions in the core network (e.g., 5GC, EPC) and/or RAN, as described herein. Although only one transmitter 830 and one receiver 835 are illustrated, the network apparatus 800 may have any suitable number of transmitters 830 and receivers 835. Further, the transmitter(s) 830 and the receiver(s) 835 may be any suitable type of transmitters and receivers.

Figure 9:
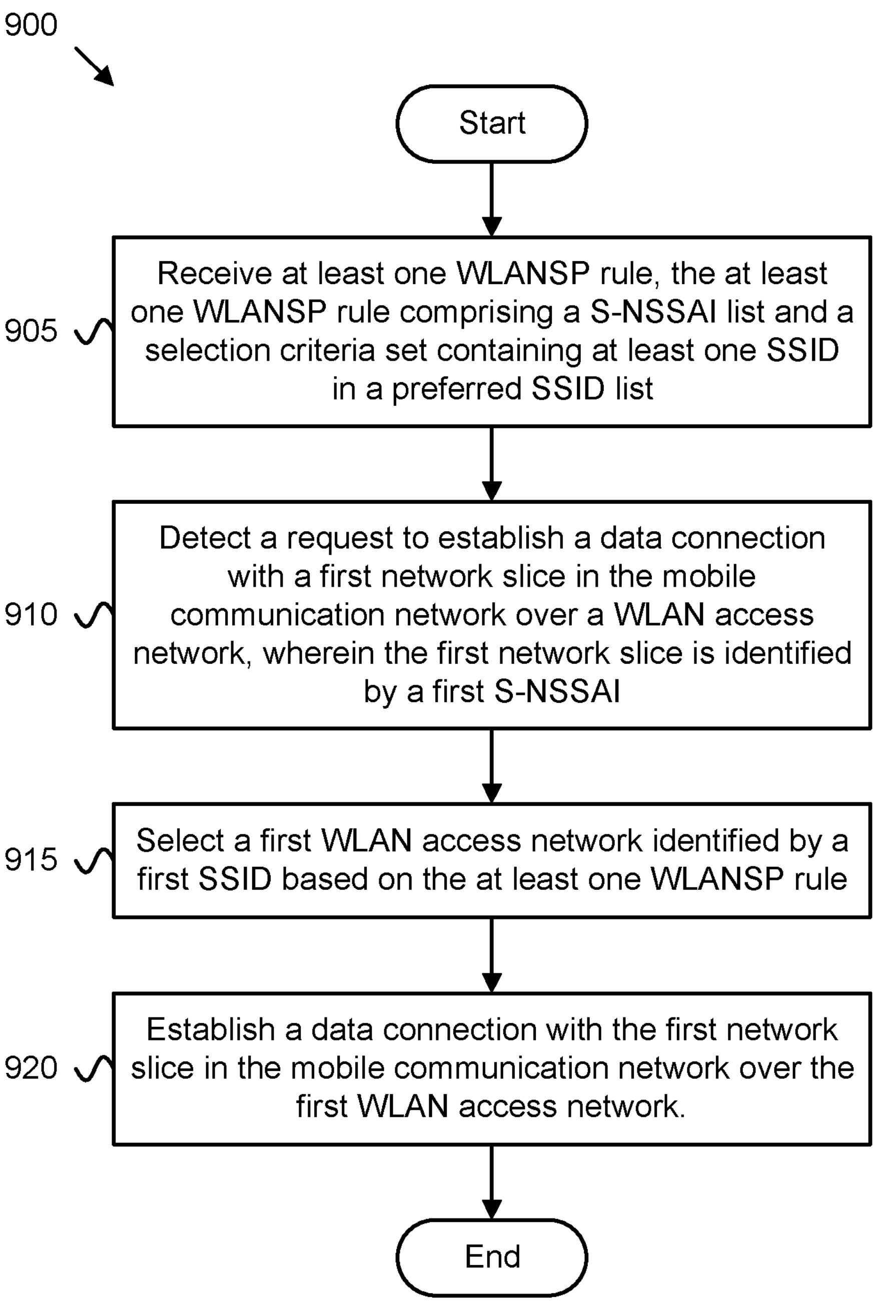
FIG. 9 is a flowchart diagram illustrating one embodiment of a method for access network selection using a selection policy rule with network slice selection assistance information.

FIG. 9 depicts one embodiment of a method 900 for access network selection using a selection policy rule with network slice selection assistance information, according to embodiments of the disclosure. In various embodiments, the method 900 is performed by a user equipment device in a mobile communication network, such as the remote unit 105, the UE 205, and/or the user equipment apparatus 700, described above. In some embodiments, the method 900 is performed by a processor, such as a microcontroller, a microprocessor, a CPU, a GPU, an auxiliary processing unit, a FPGA, or the like.

The method 900 begins and receives 905 at least one WLANSP rule, where the each WLANSP rule contains a S-NSSAI list and a selection criteria set containing at least one SSID in a preferred SSID list. Here, the S-NSSAI list contains at least one S-NSSAI, where each S-NSSAI in the list identifies a network slice in a mobile communication network, where each SSID in the preferred SSID list supports connectivity to every S-NSSAI in the S-NSSAI list.

The method 900 includes detecting 910 a request to establish a data connection with a first network slice in the mobile communication network over a WLAN access network, where the first network slice is identified by a first S-NSSAI. The method 900 includes selecting 915 a first WLAN access network identified by a first SSID based on the at least one WLANSP rule. The method 900 includes establishing 920 a data connection with the first network slice in the mobile communication network over the first WLAN access network. The method 900 ends.

Disclosed herein is a first apparatus for access network selection using a selection policy rule with network slice selection assistance information, according to embodiments of the disclosure. The first apparatus may be implemented by a user equipment device in a mobile communication network, such as the remote unit 105, the UE 205, and/or the user equipment apparatus 700, described above. The first apparatus includes a processor and a transceiver that communicates with a mobile communication network via at least one access network, said mobile communication network supporting at least one network slice. The processor receives at least one Wireless Location Area Network Selection Policy ("WLANSP") rule, the at least one WLANSP rule containing a single network slice selection assistance information ("S-NSSAI") list and a selection criteria set containing at least one Service Set Identifier ("SSID") in a preferred SSID list. Here, the S-NSSAI list contains at least one S-NSSAI, where each S-NSSAI in the S-NSSAI list identifies a network slice in the mobile communication network and where each SSID in the preferred SSID list supports connectivity to every S-NSSAI in the S-NSSAI list.

The processor detects a request to establish a data connection (e.g., PDU Session) with a first network slice in the mobile communication network over a Wireless Location Area Network ("WLAN") access network, where the first network slice is identified by a first S-NSSAI. The processor further selects a first WLAN access network identified by a first SSID based on the at least one WLANSP rule and establishes a data connection with the first network slice in the mobile communication network over the first WLAN access network.

In some embodiments, selecting the first WLAN access network includes: A) identifying a first WLANSP rule which contains the first S-NSSAI in its S-NSSAI list, B) constructing a list of available SSIDs, and C) selecting the first SSID as a highest priority SSID in the preferred SSID list of the first WLANSP rule that is also contained in the list of available SSIDs. In some embodiments, the at least one WLANSP rule contains an S-NSSAI list indicator, said indicator indicating whether the WLANSP rule comprises the S-NSSAI list.

In some embodiments, wherein the at least one WLANSP rule is not usable when connectivity is required with a network slice having an S-NSSAI not contained in the S-NSSAI list of the at least one WLANSP rule. In some embodiments, the processor registers with the mobile communication over the first WLAN access network prior to establishing the data connection with the first network slice, wherein the registration allows the first S-NSSAI. In some embodiments, the data connection with the first network slice comprises a packet data unit ("PDU") session, where the first WLAN access network is a trusted WLAN access network.

In some embodiments, the processor registers with the mobile communication network via a 3GPP access network, wherein receiving the at least one WLANSP rule occurs after successful registration via the 3GPP access network. In some embodiments, the at least one WLANSP rule is received from a policy control function ("PCF") in the mobile communication network. In some embodiments, the request to establish a data connection with a first network slice is generated by one of: a UE application, and a UE Route Selection Policy ("URSP") rule in the UE, where the URSP rule indicates that the data connection with the first network slice should be established over a non-3GPP access network.

Disclosed herein is a first method for access network selection using a selection policy rule with network slice selection assistance information, according to embodiments of the disclosure. The first method may be performed by a user equipment device in a mobile communication network, such as the remote unit 105, the UE 205, and/or the user equipment apparatus 700. The first method includes receiving at least one Wireless Location Area Network Selection Policy ("WLANSP") rule, the at least one WLANSP rule containing a single network slice selection assistance information ("S-NSSAI") list and a selection criteria set containing at least one Service Set Identifier ("SSID") in a preferred SSID list. Here, the S-NSSAI list contains at least one S-NSSAI, where each S-NSSAI in the S-NSSAI list identifies a network slice in a mobile communication network and where each SSID in the preferred SSID list supports connectivity to every S-NSSAI in the S-NSSAI list.

The first method includes detecting a request to establish a data connection with a first network slice in the mobile communication network over a Wireless Location Area Network ("WLAN") access network, where the first network slice is identified by a first S-NSSAI. The first method includes selecting a first WLAN access network identified by a first SSID based on the at least one WLANSP rule and establishing a data connection with the first network slice in the mobile communication network over the first WLAN access network.

In some embodiments, selecting the first WLAN access network includes: A) identifying a first WLANSP rule which contains the first S-NSSAI in its S-NSSAI list, B) constructing a list of available SSIDs, and C) selecting the first SSID as a highest priority SSID in the preferred SSID list of the first WLANSP rule that is also contained in the list of available SSIDs. In some embodiments, the at least one WLANSP rule contains an S-NSSAI list indicator, said indicator indicating whether the WLANSP rule comprises the S-NSSAI list.

In some embodiments, wherein the at least one WLANSP rule is not usable when connectivity is required with a network slice having an S-NSSAI not contained in the S-NSSAI list of the at least one WLANSP rule. In some embodiments, the first method further includes registering with the mobile communication over the first WLAN access network prior to establishing the data connection with the first network slice, wherein the registration allows the first S-NSSAI. In some embodiments, the data connection with the first network slice comprises a packet data unit ("PDU") session, where the first WLAN access network is a trusted WLAN access network.

In some embodiments, the first method further includes registering with the mobile communication network via a 3GPP access network, wherein receiving the at least one WLANSP rule occurs after successful registration via the 3GPP access network. In some embodiments, the at least one WLANSP rule is received from a policy control function ("PCF") in the mobile communication network. In some embodiments, the request to establish a data connection with a first network slice is generated by one of: a UE application, and a UE Route Selection Policy ("URSP") rule in the UE, where the URSP rule indicates that the data connection with the first network slice should be established over a non-3GPP access network.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a User Equipment ("UE") comprising:

receiving at least one Wireless Location Area Network Selection Policy ("WLANSP") rule, wherein the at least one WLANSP rule comprises an indicator indicating whether the WLANSP rule comprises a single network slice selection assistance information ("S-NSSAI") list, and wherein the at least one WLANSP rule further comprises:

the S-NSSAI list comprising at least one S-NSSAI, wherein each S-NSSAI in the S-NSSAI list identifies a network slice in a mobile communication network; and a selection criteria set comprising at least one Service Set Identifier ("SSID") in a SSID list, wherein each SSID in the SSID list supports connectivity to every S-NSSAI in the S-NSSAI list;

detecting a request to establish a data connection with a first network slice in the mobile communication network over a Wireless Location Area Network ("WLAN") access network, wherein the first network slice is identified by a first S-NSSAI;

selecting a first WLAN access network identified by a first SSID based on the at least one WLANSP rule; and establishing a data connection with the first network slice in the mobile communication network over the first WLAN access network.

2. The method of claim 1, wherein selecting the first WLAN access network comprises:

identifying a first WLANSP rule which comprises the first S-NSSAI in its S-NSSAI list;

constructing a list of available SSIDs; and selecting the first SSID as a highest priority SSID in the SSID list of the first WLANSP rule that is also comprised in the list of available SSIDs.

3. The method of claim 1, wherein the at least one WLANSP rule is not usable when connectivity is required with a network slice having an S-NSSAI not comprised in the S-NSSAI list of the at least one WLANSP rule.

4. The method of claim 1, further comprising registering with the mobile communication network over the first WLAN access network prior to establishing the data connection with the first network slice, wherein the registration allows the first S-NSSAI.

5. The method of claim 1, wherein the data connection with the first network slice comprises a packet data unit ("PDU") session, wherein the first WLAN access network is a trusted WLAN access network.

6. The method of claim 1, further comprising registering with the mobile communication network via a Third-Generation Partnership Project ("3GPP") access network, wherein receiving the at least one WLANSP rule occurs after successful registration via the 3GPP access network.

7. The method of claim 1, wherein the at least one WLANSP rule is received from a policy control function ("PCF") in the mobile communication network.

8. The method of claim 1, wherein the request to establish a data connection with a first network slice is generated by one of: a UE application, and a UE Route Selection Policy ("URSP") rule in the UE, wherein the URSP rule indicates that the data connection with the first network slice should be established over a non-Third-Generation Partnership Project ("non-3GPP") access network.

9. A User Equipment ("UE") for wireless communication, comprising:

at least one memory; and at least one processor coupled with the at least one memory and configured to cause the UE to:

receives at least one Wireless Location Area Network Selection Policy ("WLANSP") rule, wherein the at least one WLANSP rule comprises an indicator indicating whether the WLANSP rule comprises a single network slice selection assistance information ("S-NSSAI") list, and wherein the at least one WLANSP rule further comprises:

S-NSSAI list comprising at least one S-NSSAI, wherein each S-NSSAI in the S-NSSAI list identifies a network slice in a mobile communication network; and a selection criteria set comprising at least one Service Set Identifier ("SSID") in a SSID list, wherein each SSID in the SSID list supports connectivity to every S-NSSAI in the S-NSSAI list;

detects a request to establish a data connection with a first network slice in the mobile communication network over a Wireless Location Area Network ("WLAN") access network, wherein the first network slice is identified by a first S-NSSAI;

selects a first WLAN access network identified by a first SSID based on the at least one WLANSP rule; and establishes a data connection with the first network slice in the mobile communication network over the first WLAN access network.

10. The UE of claim 9, wherein selecting the first WLAN access network comprises:

identifying a first WLANSP rule which comprises the first S-NSSAI in its S-NSSAI list;

constructing a list of available SSIDs; and selecting the first SSID as a highest priority SSID in the SSIDs of the first WLANSP rule that is also comprised in the list of available SSIDs.

11. The UE of claim 9, wherein the at least one WLANSP rule is not usable when connectivity is required with a network slice having an S-NSSAI not comprised in the S-NSSAI list of the at least one WLANSP rule.

12. The UE of claim 9, wherein the at least one processor is further configured to cause the UE to register with the mobile communication network over the first WLAN access network prior to establishing the data connection with the first network slice, wherein the registration allows the first S-NSSAI.

13. The UE of claim 9, wherein the data connection with the first network slice comprises a packet data unit ("PDU") session, wherein the first WLAN access network is a trusted WLAN access network.

14. The UE of claim 9, wherein the at least one processor is further configured to cause the UE to register with the mobile communication network via a Third-Generation Partnership Project ("3GPP") access network, wherein receiving the at least one WLANSP rule occurs after successful registration via the 3GPP access network.

15. The UE of claim 9, wherein the at least one WLANSP rule is received from a policy control function ("PCF") in the mobile communication network.

16. The UE of claim 9, wherein the request to establish a data connection with a first network slice is generated by one of: a UE application, and a UE Route Selection Policy ("URSP") rule in the UE, wherein the URSP rule indicates that the data connection with the first network slice should be established over a non-Third-Generation Partnership Project ("non-3GPP") access network.

* * * * *